United States Patent [19]
MacEachern

[11] Patent Number: 5,857,823
[45] Date of Patent: Jan. 12, 1999

[54] ARTICULATED SELF-PROPELLED BOAT TRAILER AND TUG

[76] Inventor: William A. MacEachern, P.O. Box 911, Sicamous, British Columbia, Canada, V0E 2V0

[21] Appl. No.: 815,606

[22] Filed: Mar. 12, 1997

Related U.S. Application Data

[60] Provisional application No. 60/013,315 Mar. 13, 1996.

[51] Int. Cl.⁶ .................................................. B60P 3/10
[52] U.S. Cl. ...................... 414/458; 280/414.1; 280/494; 414/476
[58] Field of Search .................................. 414/458, 474, 414/476, 495, 482–485; 280/414.1, 414.5, 492, 494, 442; 150/418

[56] References Cited

U.S. PATENT DOCUMENTS

| | | | |
|---|---|---|---|
| 1,557,841 | 10/1925 | Holmes | 280/494 |
| 3,207,233 | 9/1965 | Shumaker | 280/414.5 X |
| 3,346,131 | 10/1967 | Lundell | 280/414.5 X |
| 3,484,843 | 12/1969 | Martin | 280/494 X |
| 3,517,944 | 6/1970 | Hage | 280/414.5 |
| 3,539,065 | 11/1970 | Brownell | 414/458 |
| 3,572,743 | 3/1971 | Parr | 414/458 X |
| 3,792,789 | 2/1974 | Oehler | 414/458 |
| 3,827,518 | 8/1974 | Juhl et al. | 280/492 X |
| 4,348,149 | 9/1982 | Deamer | 414/458 |
| 4,548,423 | 10/1985 | Craven | 280/492 |
| 4,619,578 | 10/1986 | Routledge | 414/458 X |
| 4,915,577 | 4/1990 | Fraser | 414/476 |
| 4,926,621 | 5/1990 | Torras | 280/494 X |
| 4,946,182 | 8/1990 | Weber | 280/402 |
| 5,186,483 | 2/1993 | Sheppard | 280/494 |
| 5,228,713 | 7/1993 | Kovach | 280/414.1 |
| 5,255,933 | 10/1993 | Carrick | 280/414.1 |
| 5,531,283 | 7/1996 | Austin et al. | 280/494 X |
| 5,570,754 | 11/1996 | Stimson | 280/402 |
| 5,711,541 | 1/1998 | Middlin et al. | 280/492 |

FOREIGN PATENT DOCUMENTS

| | | | |
|---|---|---|---|
| 1303180 | 7/1962 | France | 280/494 |

*Primary Examiner*—David A. Bucci
*Attorney, Agent, or Firm*—Anthony C. Edwards

[57] ABSTRACT

An articulated self-propelled tug and boat trailer. The trailer is mounted on wheels and includes a laterally opposed pair of generally parallel spaced apart longitudinally extending hull supporting members connected by cross members. The hull supporting members are pivotable about the trailer wheels. Independently actuable hydraulic rams selectively or simultaneously elevate either or both of the longitudinally extending hull supporting members relative to the trailer wheels. The cross members which rigidly mount the hull supporting members to a universal articulatable joint having three rotational degrees of freedom. A self-propelled tug is the opposite side of the universal articulatable joint. Independent hydraulic rams independently and selectively pivot the trailer and the tug relative to each other about each of the three rotational degrees of freedom. The tug has drive wheels for selectively self-propelled translation of the tug and the trailer. The drive wheels are selectively pivotable to steer the tug.

4 Claims, 8 Drawing Sheets

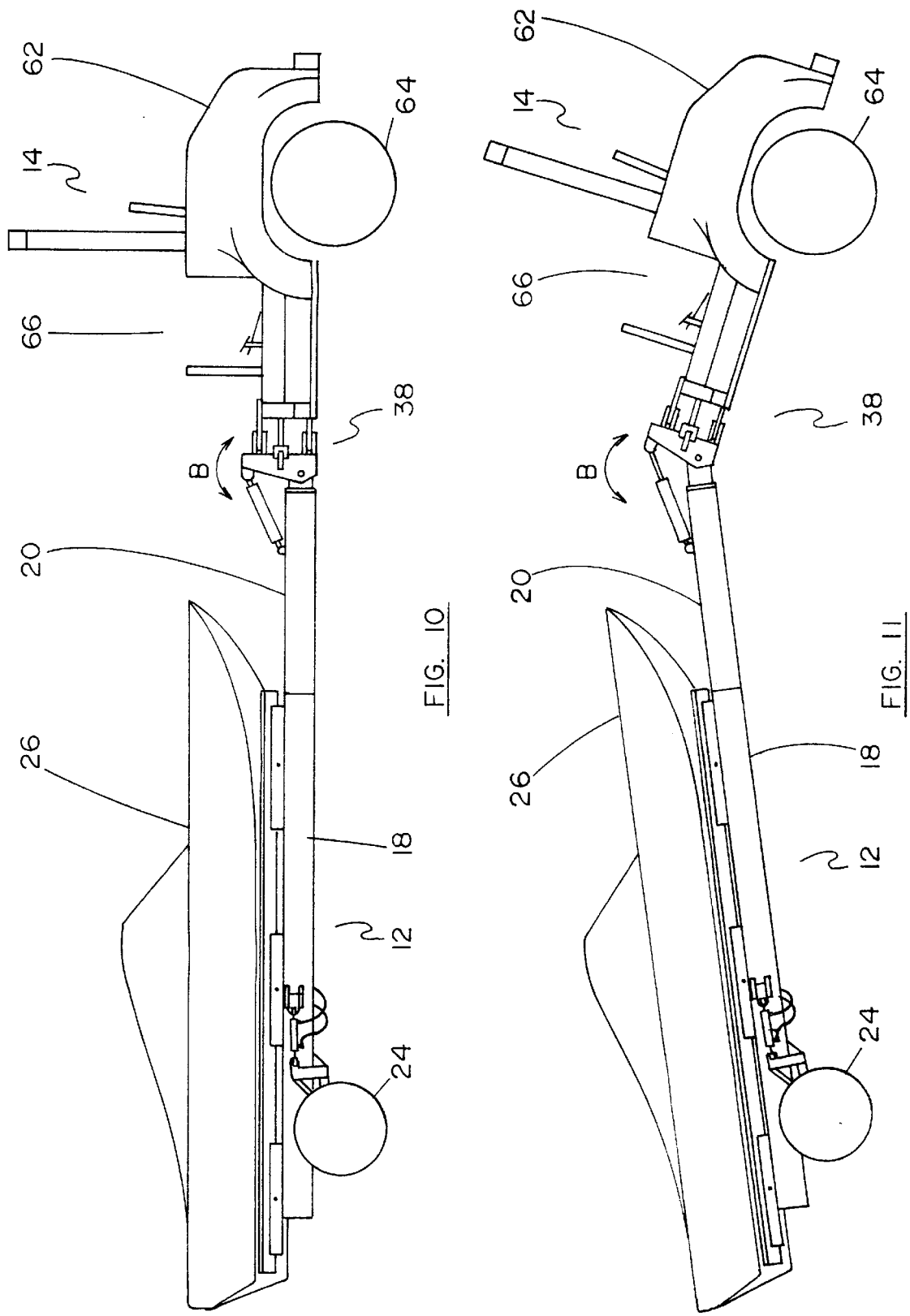

ARTICULATED SELF-PROPELLED BOAT TRAILER AND TUG

CROSS REFERENCE TO RELATED APPLICATION

This application claims priority from U.S. Provisional patent application No. 60/013,315 filed Mar. 13, 1996, titled Articulated Self-Propelled Boat Trailer and Tug.

FIELD OF THE INVENTION

This invention relates to the field of trailers for boats and in particular to articulated self-propelled boat trailers.

BACKGROUND OF THE INVENTION

Many marinas, instead of mooring boats, offer the service for their customers of dry land storage. In such facilities, a customer phones ahead to the marina when the customer desires to use the boat and the marina will then remove the boat from storage in a timely fashion, so that the customer does not have to wait for the boat to be put into the water. In many such marinas, space is at a premium and the greater the number of boats that may be stored in a particular facility, the greater the cost efficiency to the owner of the marina. Thus, the pressure is to increase the density of the dry land storage facilities. One limiting factor in the storage facility density is the size of the access lanes which must be provided to enable parking and removal of a boat from a storage slot. Conventional boat trailers and conventional propulsion devices for those trailers, such as trucks or other conventionally steered vehicles, require considerable access room in order to position a conventional trailer For boats other than very small boats, removing a boat trailer manually is not a viable option.

Consequently, there is a need in the marina service industry for a fully-articulated combination trailer and motorized tug which, because of its maneouverability, requires a decreased access lane size to insert or remove a boat carried thereon into a dry land storage slot Additionally, if the trailer is also selectively elevatable, then, once the boat is positioned in the storage slot, the boat may be elevated and static stands placed beneath the hull so that the articulated trailer may be removed. It is one of the objects of the present invention to provide such a device.

Applicant is aware of U.S. Pat. No. 5,570,754 which issued Nov. 5, 1996, to Stimson for a Tractor and Trailer for Moving Loads in Confined Spaces. Stimson discloses independently-steerable wheels on the tractor. Applicant is also aware of U.S. Pat. No. 3,539,065 for a Trailer and U.S. Pat. No. 4,915,577 for a Self-propelled Mobile Cradle for Boats which teaches a trailer independently elevatable at its rear wheels. Applicant is also aware of U.S. Pat. No. 4,946,182 for a Multi-directional Adjustable Towing Hitch which discloses an trailer hitch articulated joint with two degrees of freedom.

SUMMARY OF THE INVENTION

In the articulated self-propelled boat trailer and tug of the present invention, the trailer includes a laterally opposed pair of generally parallel spaced apart longitudinally extending hull supporting members having first and second ends, a corresponding laterally opposed pair of first translation means mounted to and disposed a first vertical distance beneath the laterally opposed pair of longitudinally extending hull supporting members generally in proximity to the first end. The hull supporting members are pivotable about a laterally extending axis through the laterally opposed pair of first translation means. The trailer further includes independently actuable elevation means, for selectively simultaneously elevating both of the longitudinally extending hull supporting members relative to the laterally opposed pair of first translation means, the independently actuable elevation means mounted to the laterally opposed pair of longitudinally extending hull supporting members, whereby the first vertical distance may be selectively varied.

The laterally opposed pair of generally parallel spaced apart longitudinally extending hull supporting members are rigidly mounted at their second ends to cross members which rigidly mount the second ends to a first longitudinal side of a universal articulatable joint having three rotational degrees of freedom.

A self-propelled tug is mounted to a second longitudinally opposed side of the universal articulatable joint. Mounted between the trailer and tug are means for independently and selectively pivoting the trailer and the tug relative to each other about each of the three rotational degrees of freedom.

The tug further includes a laterally opposed pair of second translation means for selectively self-propelled translation of the tug and the trailer where the tug and trailer are longitudinally flexibly connected by the universal articulatable joint. The tug is pivotable about a laterally extending axis through the laterally opposed pair of second translation means, Each of the second translation means are selectively pivotable by steering means about a corresponding vertical axis through the second translation means independent of the pivoting of the trailer and the tug relative to each other about each of the three rotational degrees of freedom and independent of the elevation means.

In one aspect, the first and second translation means are wheels and the means for independently and selectively pivoting the trailer and the tug relative to each other about each of the three rotational degrees of freedom includes selectively actuable hydraulic cylinders extending between the trailer and the tug so as to selectively and independently apply rotational bending moments between the trailer and the tug about the three rotational degrees of freedom of the universal articulatable joint. In a further aspect, the first translation means are free turning wheels and the second translation means are drive wheels coupled to a selectively engageable self-propelling means mounted on the self-propelled tug.

Advantageously, the apparatus includes an operator console on the self-propelled tug for selectively controlling independent selective actuation of the elevation means, the steering means and the means for independently and selectively pivoting the trailer and tug relative to each other about each of the three rotational degrees of freedom of the universal articulatable joint.

BRIEF DESCRIPTION OF THE DRAWINGS

FIG. 10 is a boat supported on the boat trailer and tug of the present invention with the boat trailer level.

FIG. 11 is a boat supported on the boat trailer and tug of the present invention with the boat trailer inclined.

DETAILED DESCRIPTION OF THE PREFERRED EMBODIMENT

Figure 1:
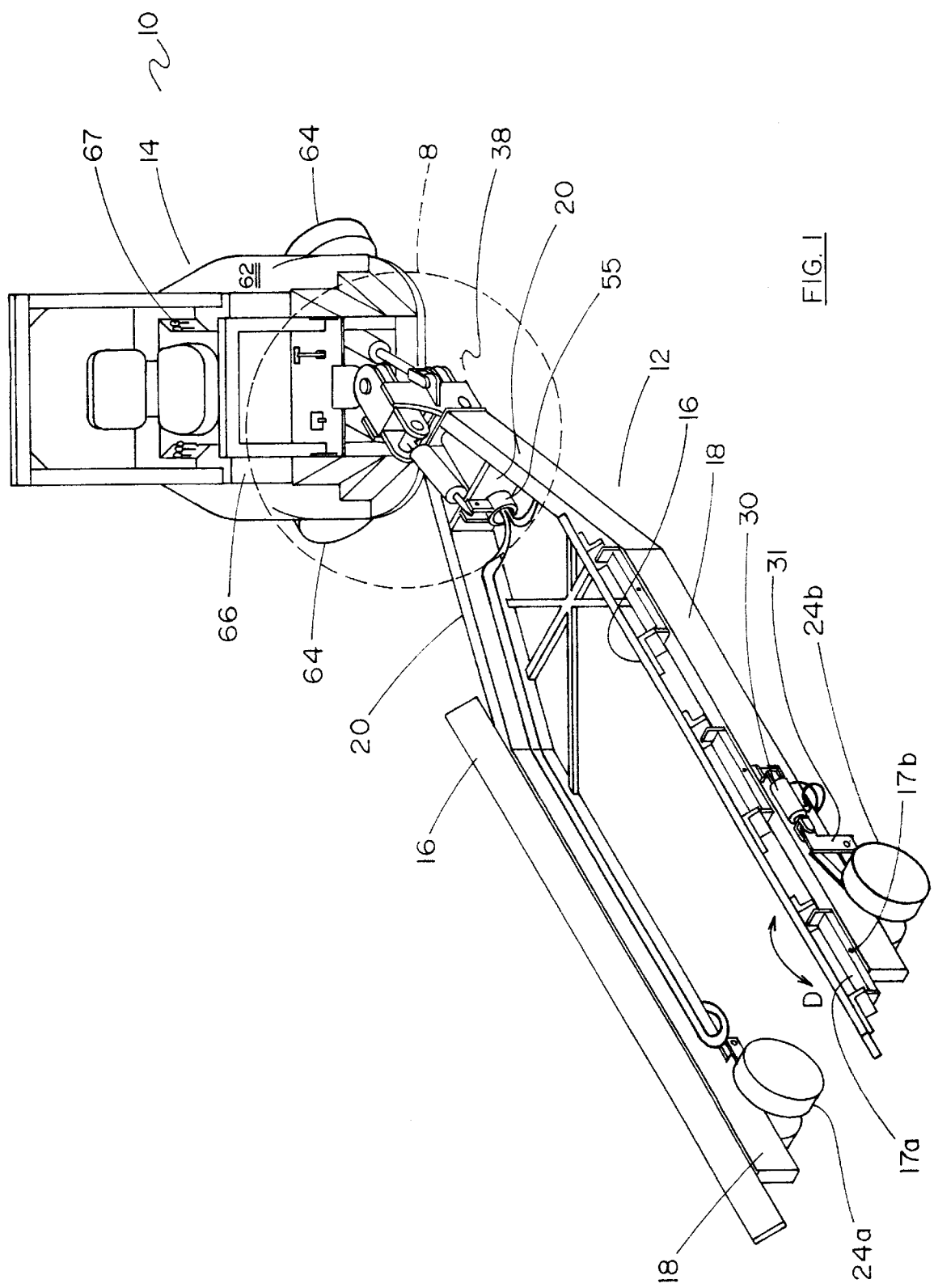
FIG. 1 is, in perspective view, the boat trailer and tug of the present invention.
Figure 2:
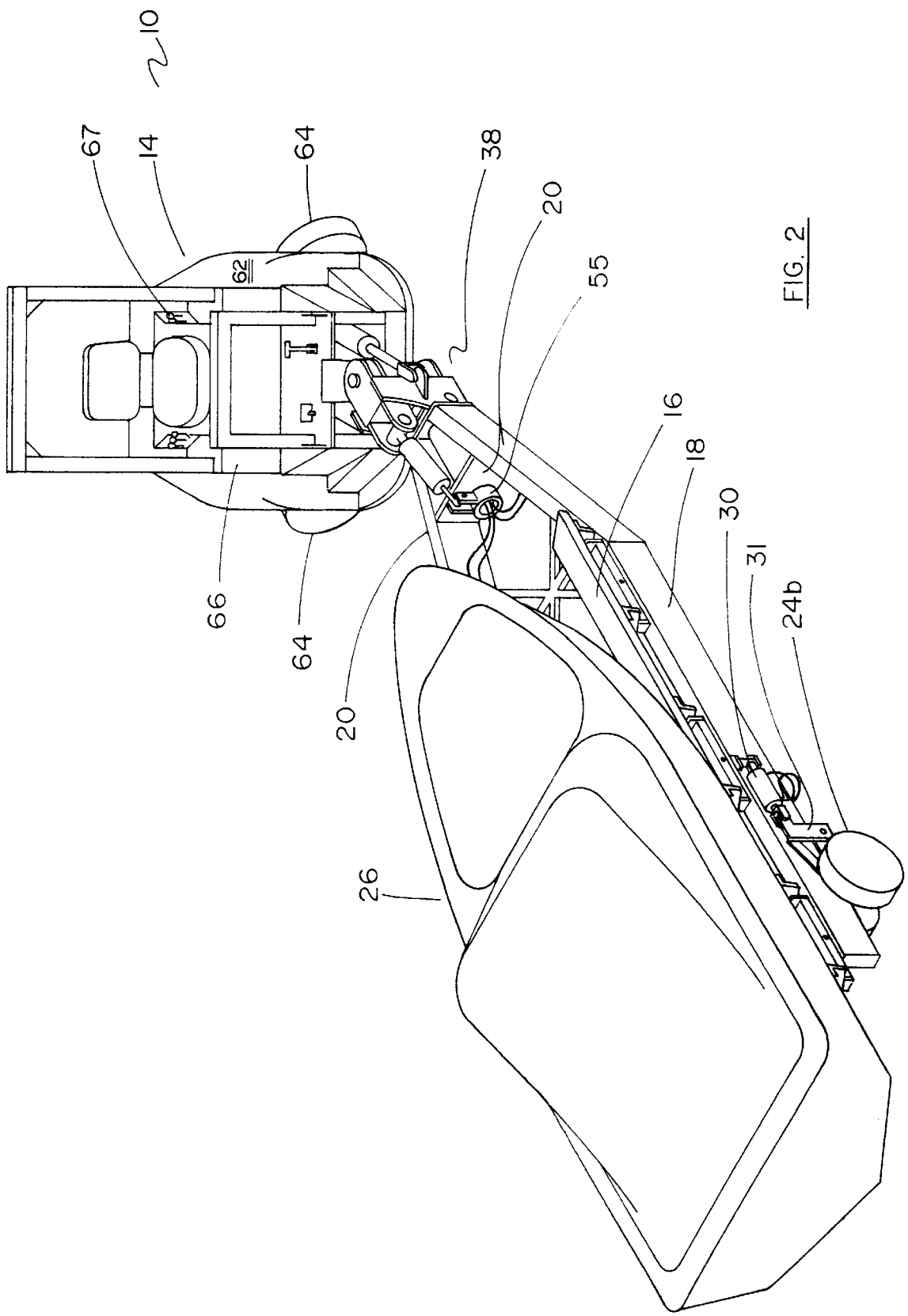
FIG. 2 is, in top perspective view, a boat supported on the boat trailer and tug of the present invention with the tug in a dog-tracking position.

As seen in FIGS. 1 and 2, the apparatus 10 of the present invention has boat trailer 12 propelled by self-propelled tug 14.

Boat trailer 12 has flexible longitudinally extending bunks 16 supported on pivot mounted walking beams 17a. Walking beams 17a are pivotally mounted on pins 17b to the upper surfaces of longitudinally extending support structures 18, which may, as illustrated, be brace work or otherwise rigid longitudinally extending beam members or the like. Support structures 18 are connected by rigid connecting structures 20 which may be a continuation of, or similar to, support structures 18 so as to form a unitary planar generally horizontal U-shaped structure extending between where the connecting structures 20 connect to articulated joint 38, better seen in FIGS. 3 and 8, and the end of support structures 18. Support structures 18 are supported by trailer wheels 24a and 24b. Boat 26 is supported by resting its hull on bunks 16 in the conventional manner.

Figure 4:
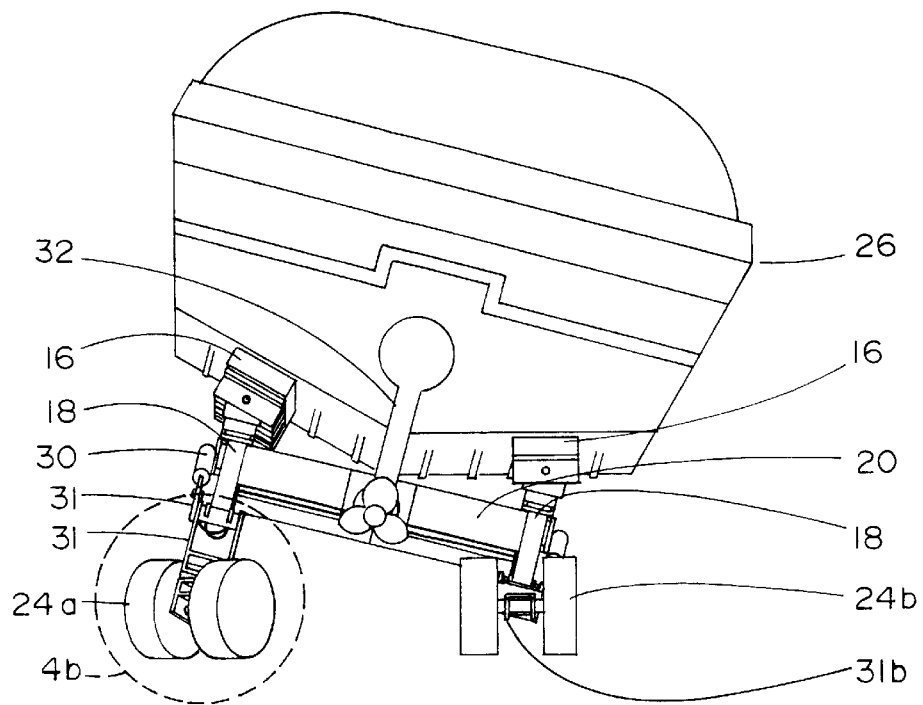
FIG. 4 is, in rear elevation view, a boat supported on the boat trailer of the present invention with one side of the boat trailer elevated.
Figure 4A:
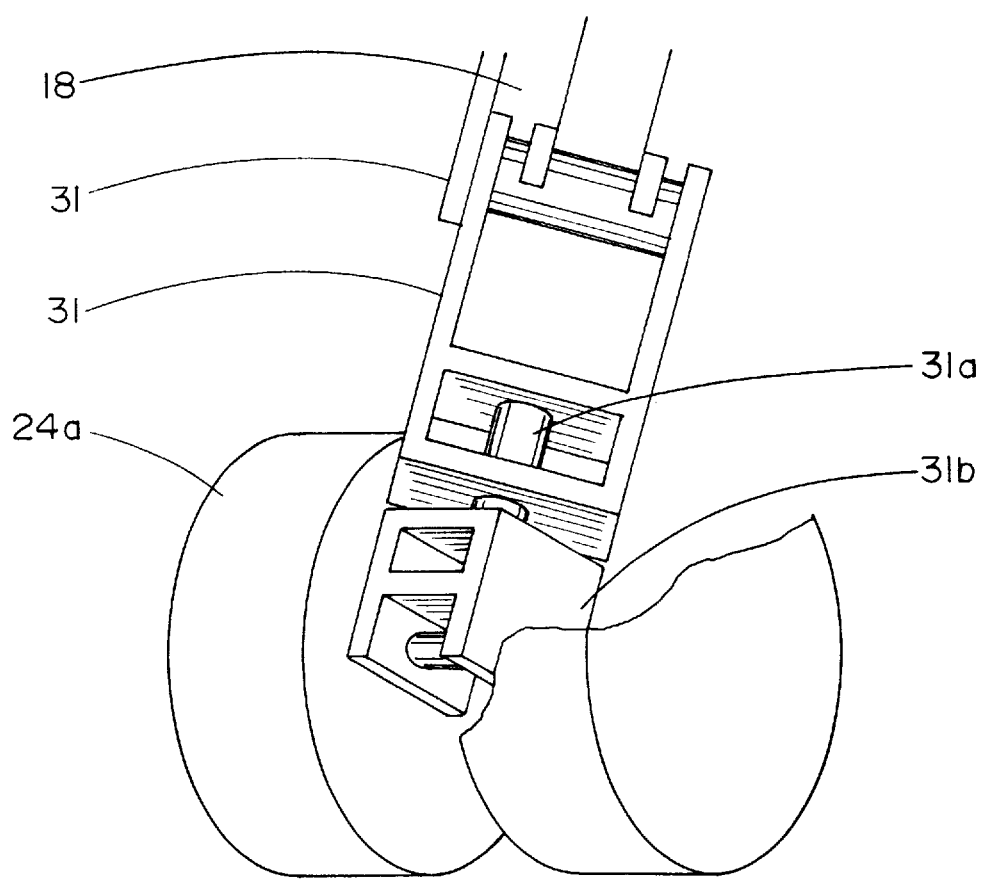
FIG. 4a is, in enlarged cut-away view, the boat trailer wheel swivel linkage of the boat trailer of FIG. 4.
Figure 5:
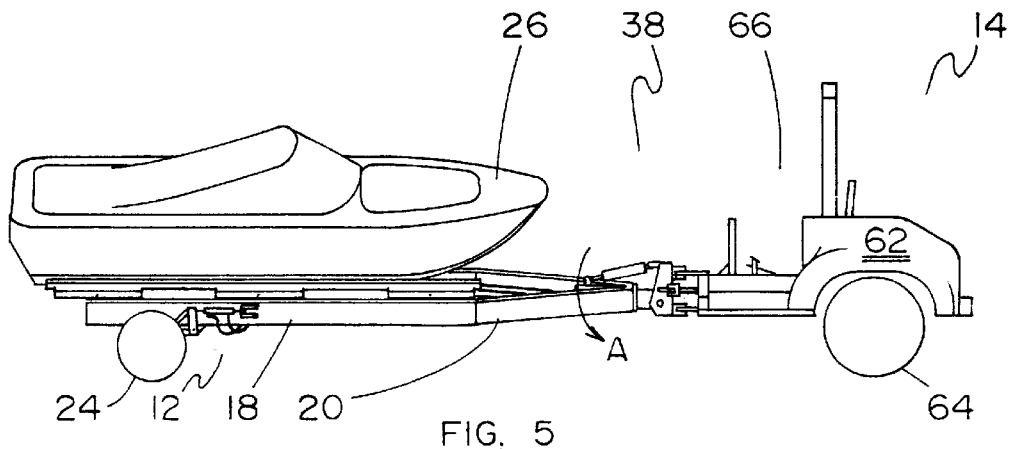
FIG. 5 is, in right side elevation view, the boat supported on the boat trailer and tug of the present invention of FIG. 4.
Figure 6:
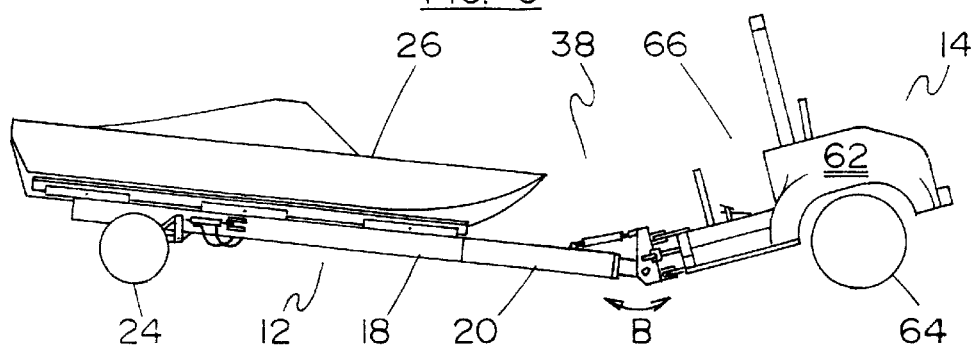
FIG. 6 is, in side elevation view, a boat supported on the boat trailer and tug of the present invention with the trailer tilted downwardly.
Figure 7:
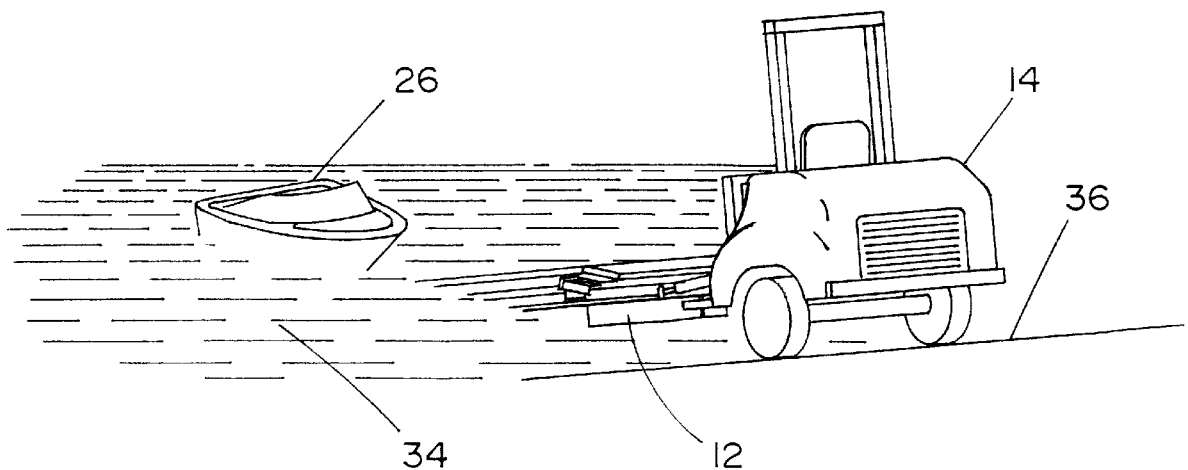
FIG. 7 is, in perspective view, the boat trailer and tug of the present invention with the trailer submerged and the tug on an inclined boat ramp.

Each of trailer wheels 24a and 24b, that is, whether the trailer wheels are singular wheels or tandem wheels as illustrated as port trailer wheels 24a and the starboard trailer wheels 24b, has its corresponding independently-actuable, hydraulic cylinder 30, seen in operation in FIG. 4. Trailer hydraulic cylinders 30 may be independently and selectively actuated to rotate linkages 31 to either tilt boat 26 by selectively elevating either the port or the starboard side of boat 26, the port side illustrated as elevated in FIGS. 4 and 5. Both trailer hydraulic cylinders 30 may be actuated simultaneously to elevate the boat 26 and support structures 18 relative to trailer wheels 24. It has been found that tilting of boat 26 as seen in FIGS. 4 and 5 is advantageous when it is desired to, for example, maintain the boat motor leg 32 or for ease of access into the boat itself. As seen in FIG. 4a, preferably wheels 24 are free to pivot relative to linkage 31 about a shaft 31 a coupling axle mount 31 b to linkage 31 to alleviate lateral strain on wheels 24. The simultaneous actuation of both trailer hydraulic cylinders 30 results in a boat elevated for removal from the water 34, up inclined ramp 36 such as seen in FIG. 7, so as to minimize the risk of scraping the motor leg 32 against the surface of ramp 36.

Figure 3:
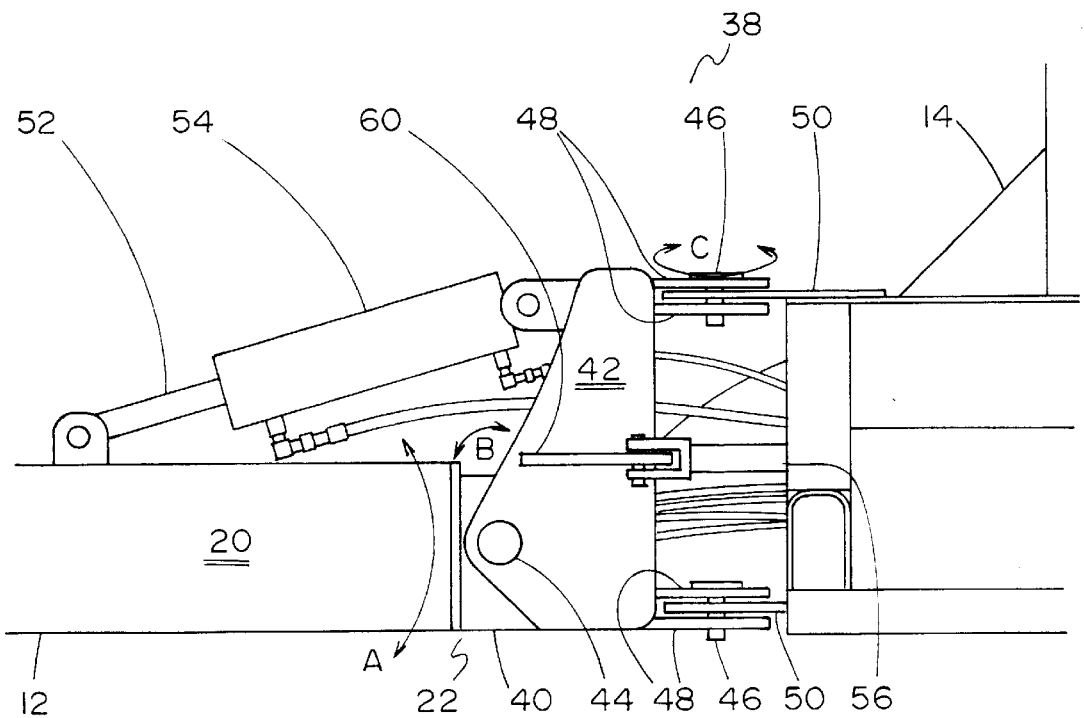
FIG. 3 is, in side elevation view, the articulated joint of the boat trailer and tug of the present invention.
Figure 8:
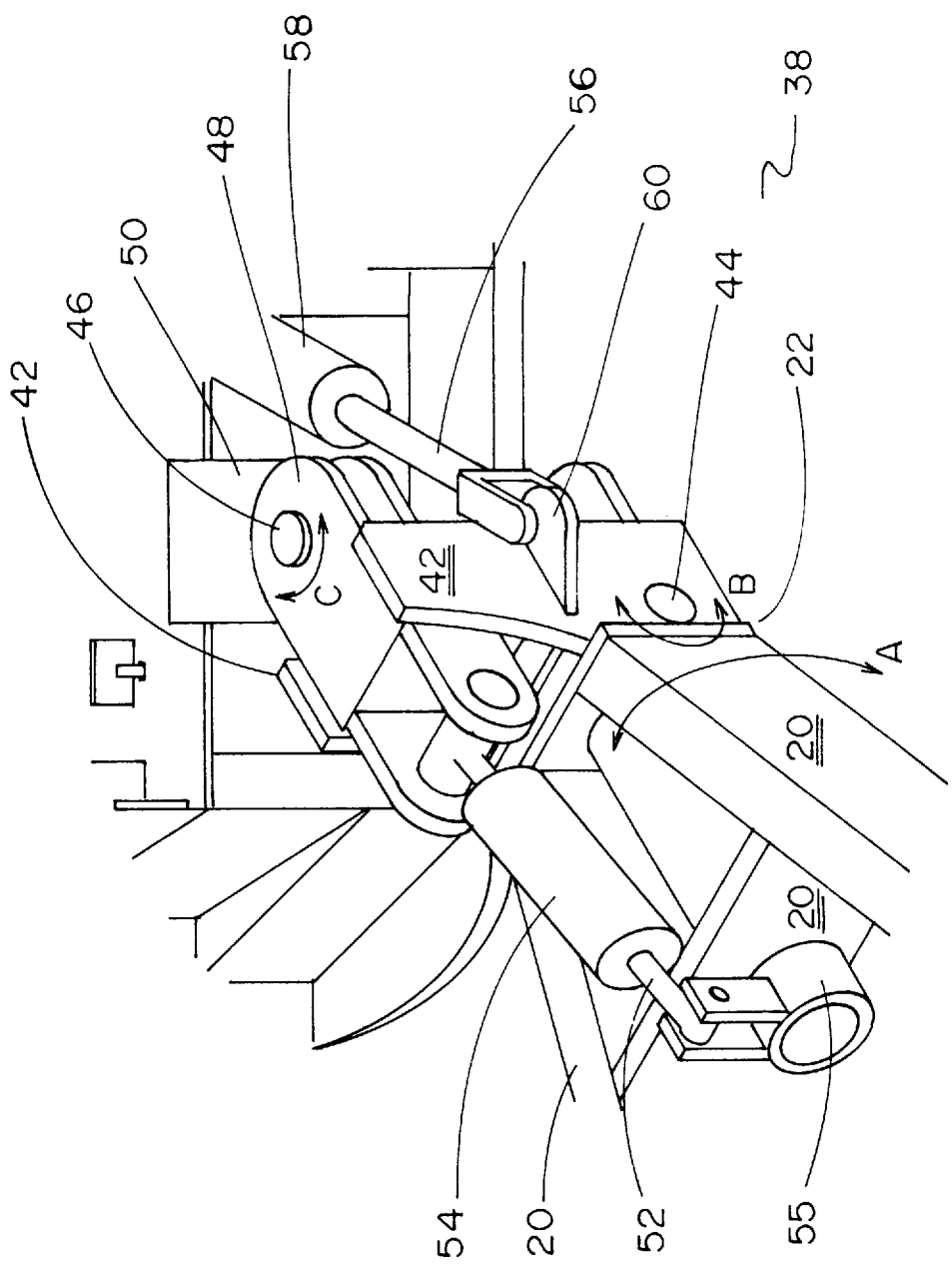
FIG. 8 is, in enlarged perspective view, the articulated joint of FIG. 1.

As best seen in FIGS. 3 and 8, universal joint 22 forms one of the articulating components of articulated joint 38 which connects boat trailer 12 to tug 14. Universal joint 22 is free to rotate in direction A, so as to rotate connecting structures 20 and support structures 18 in direction A relative to coupler 40. Coupler 40 pivots in direction B relative to frame 42 on pins 44.

Frame 42 is rotatably coupled to tug 14 by means of hinge pins 46 journalled in hinge mounts 48 on frame 42 and corresponding hinge mounts 50 on tug 14. Frame 42 is rotatable relative to tug 14 in direction C.

The relative position of boat trailer 12 relative to tug 14 as determined by the degree of rotation in direction B of coupler 40 relative to frame 42 is governed by the selectively actuable extension of ram 52 from hydraulic cylinder 54. Ram 52 and hydraulic cylinder 54 are rotatably mounted at their opposed ends to collar 55, rotatably journalled within connecting structures 20 so as to allow rotation of structures 20 in direction A, and frame 42 respectively to allow for pivoting motion in direction B. Selective actuation of independently-actuable trailer hydraulic cylinders 30 result in rotation of boat trailer 12 in direction A relative to coupler 40, frame 42 and tug 14. Connecting structures 20 are rotatably mounted to coupler 40 at universal joint 22 as by a rotatable shaft or axle (not shown) extending from connecting structures 20 into coupler 40.

Rotation in direction C is the result of selective actuation of ram 56 from hydraulic 10 cylinder 58. The end of ram 56 is rotatably mounted to arm 60 which extends laterally outwardly of frame 42.

Figure 9:
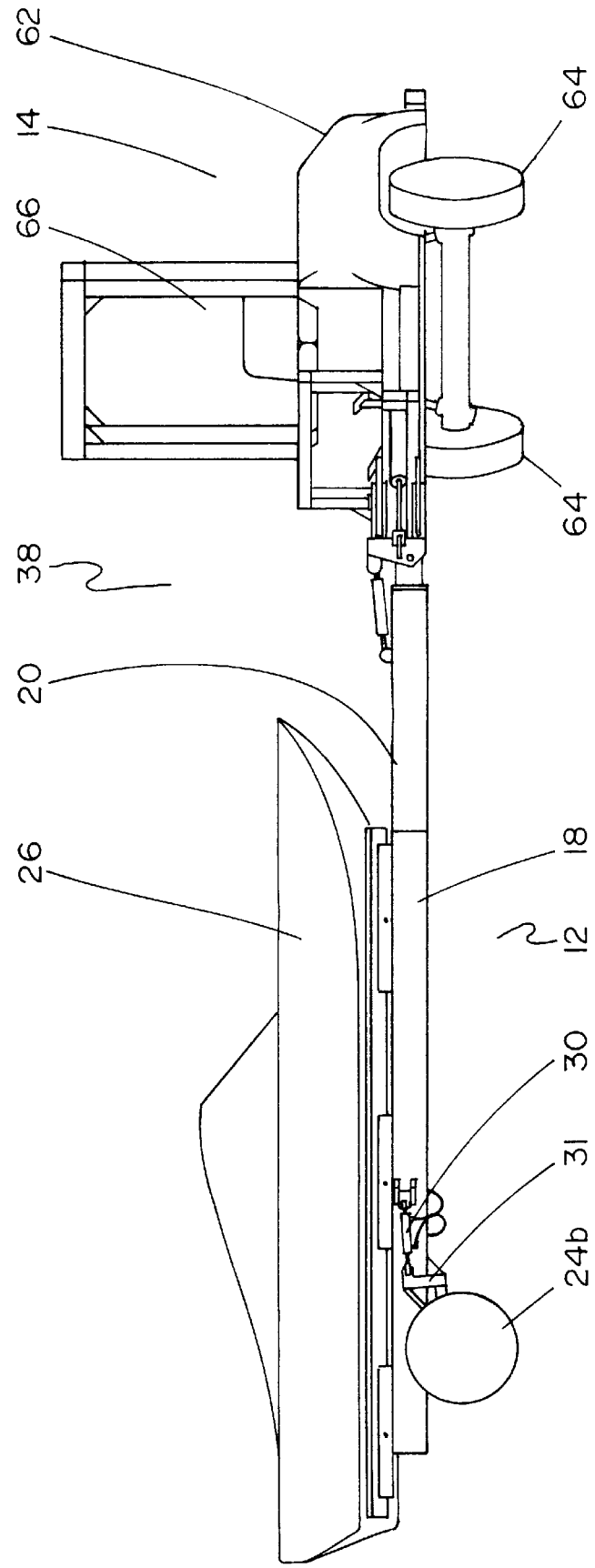
FIG. 9 is, in right side elevation view, the boat supported on the boat trailer and tug of the present invention of FIG. 2.

Tug 14 is self propelled by means of a motor (not shown) contained within motor housing 62. As seen in FIG. 9, drive wheels 64 may be pivoted on a conventional steering wheel pivoting assembly as controlled by a steering wheel (not shown) in the driver cockpit 66. Controls 67 for selective actuation of cylinders 30, 54 and 58 are also located in driver cockpit 66.

As better seen in FIGS. 1, 2 and 9, drive wheels 64 may be pivoted so as to "dog track" tug 14 relative to boat trailer 12, that is, so that tug 14 may be translated perpendicularly relative to the longitudinal axis of boat trailer 12. Pivoting drive wheels 64 relative to tug 14 combined with the rotational motion of frame 42 in direction C relative to tug 14 results in coupled motion between tug 14 and boat trailer 12 which allows positioning of boat trailer 12 in confined spaces.

As illustrated in FIGS. 10 and 11, relative rotation in direction B of boat trailer 12 relative to tug 14 tilts boat trailer 12 upwardly from the horizontal or returns boat trailer 12 to the horizontal from an upwardly tilted position. Tilting boat trailer 12 upwardly facilitates draining water which may accumulate in the bilges of boat 26.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An articulated self-propelled boat trailer and tug comprising:
    (a) a trailer, wherein said trailer comprises, a laterally opposed pair of generally parallel spaced apart longitudinally extending hull supporting members having first and second ends,
        a corresponding laterally opposed pair of first translation means mounted to and disposed a first vertical distance beneath said laterally opposed pair of longitudinally extending hull supporting members generally in proximity to said first end, said hull supporting members pivotable about a laterally extending axis through said laterally opposed pair of first translation means, independently actuable elevation means, for selectively elevating said longitudinally extending hull supporting members relative to said laterally opposed pair of first translation means, said independently actuable elevation means mounted to said laterally opposed pair of longitudinally extending hull supporting members, whereby said first vertical distance may be selectively varied, said laterally opposed pair of generally parallel spaced apart longitudinally extending hull supporting members rigidly mounted at their second ends to cross members, rigidly mounting said second ends to a first side of a universal articulatable joint having three rotational degrees of freedom, (b) a self-propelled tug mounted to a second longitudinally opposed side of said universal articulatable joint, (c) means for independently and selectively pivoting said trailer and said tug relative to each other about each of said three rotational degrees of freedom, said means for independently and selectively pivoting said trailer and tug relative to each other mounted to said universal articulatable joint.

wherein said tug further comprises a laterally opposed pair of second translation means for selectively self-propelled translation of said tug and said trailer, said tug pivotable about a laterally extending axis through said laterally opposed pair of second translation means, each of said laterally opposed pair of second translation means selectively pivotable by steering means about a corresponding vertical axis through said second translation means independent of said pivoting of said trailer and said tug relative to each other about each of said three rotational degrees of freedom and independent of said elevation means.

2. The device of claim 1 wherein said first and second translation means are wheels and wherein said means for independently and selectively pivoting said trailer and said tug relative to each other about each of said three rotational degrees of freedom comprises selectively actuable hydraulic cylinders extending between said trailer and said tug so as to selectively and independently apply rotational bending moments between said trailer and said tug about said three rotational degrees of freedom of said universal articulatable joint.

3. The device of claim 2 wherein said elevation means are an opposed pair of independently actuable mechanical linkages, said first translation means are wheels rotatable about horizontal axes and pivotable relative to said mechanical linkages on a pivotable couple pivotally mounting said wheels to said mechanical linkage, and said second translation means are drive wheels coupled to a selectively engageable self-propelling means mounted on said self-propelled tug.

4. The device of claim 3 further comprising an operator console on said self-propelled tug for selectively controlling independent selective actuation of said elevation means, said steering means and said means for independently and selectively pivoting said trailer and tug relative to each other about each of said three rotational degrees of freedom.

* * * * *